US007827689B2

(12) United States Patent
Crane et al.

(10) Patent No.: US 7,827,689 B2
(45) Date of Patent: Nov. 9, 2010

(54) COKE OVEN RECONSTRUCTION

(75) Inventors: James D. Crane, Batavia, NY (US); Robert A. Bloom, Orchard Park, NY (US)

(73) Assignee: Vanocur Refractories, L.L.C., Tonawanda, NY (US)

( * ) Notice: Subject to any disclaimer, the term of this patent is extended or adjusted under 35 U.S.C. 154(b) by 276 days.

(21) Appl. No.: 11/653,695

(22) Filed: Jan. 16, 2007

(65) Prior Publication Data

US 2008/0169578 A1 Jul. 17, 2008

(51) Int. Cl.
*B23P 6/00* (2006.01)
*F27D 1/16* (2006.01)

(52) U.S. Cl. .............................. 29/890.031; 29/402.09; 29/402.11; 52/302.4; 52/606; 110/314; 110/336; 110/337; 110/341; 264/30

(58) Field of Classification Search ............ 29/890.031, 29/402.01, 402.03, 402.09, 402.11, 402.13, 29/464, 402.18; 52/218, 219, 302.4, 606; 110/336, 337, 341, 314; 202/133, 139, 233, 202/242; 264/30; 201/41; 33/408
See application file for complete search history.

(56) References Cited

U.S. PATENT DOCUMENTS

| | | | | | |
|---|---|---|---|---|---|
| 4,059,885 | A | * | 11/1977 | Oldengott | 29/402.09 |
| 4,069,633 | A | * | 1/1978 | Cooper et al. | 52/578 |
| 4,285,139 | A | * | 8/1981 | Huston | 33/407 |
| 4,364,798 | A | * | 12/1982 | Costa | 202/267.1 |
| 4,452,749 | A | * | 6/1984 | Kolvek et al. | 264/30 |
| 4,565,605 | A | * | 1/1986 | Kruse | 202/139 |
| 5,227,106 | A | * | 7/1993 | Kolvek | 264/654 |
| 5,423,152 | A | | 6/1995 | Kolvek | |
| 5,597,452 | A | * | 1/1997 | Hippe et al. | 201/41 |
| 6,066,236 | A | * | 5/2000 | Gilroy | 202/138 |
| 6,128,822 | A | * | 10/2000 | Nishio et al. | 29/890.031 |
| 6,539,602 | B1 | * | 4/2003 | Ozawa et al. | 29/402.11 |

* cited by examiner

*Primary Examiner*—David P Bryant
*Assistant Examiner*—Ryan J Walters
(74) *Attorney, Agent, or Firm*—Stephen B. Saiai, Esq.; Michael J. Didas, Esq.; Harter Secrest & Emery LLP

(57) ABSTRACT

A new, faster and more efficient process to replace heating walls and ceilings in coke oven batteries. Thus, when replaced, at least one heating wall is constructed of thermally stable non-expanding large size modular cast modules from end to end and the ceiling adjacent the heating wall is constructed of thermally stable non-expanding large modular cast blocks.

11 Claims, 20 Drawing Sheets

--PRIOR ART--

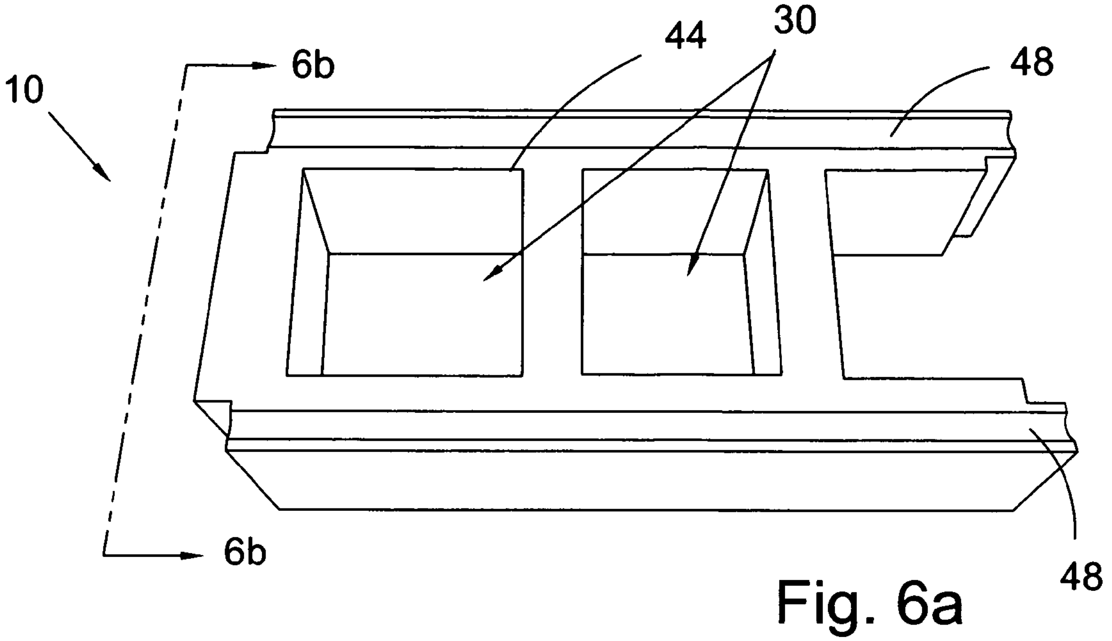
Fig. 6a
Fig. 6b
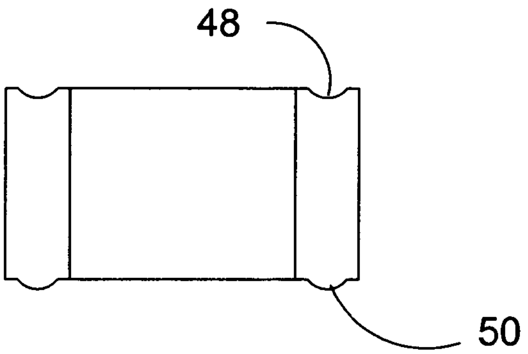
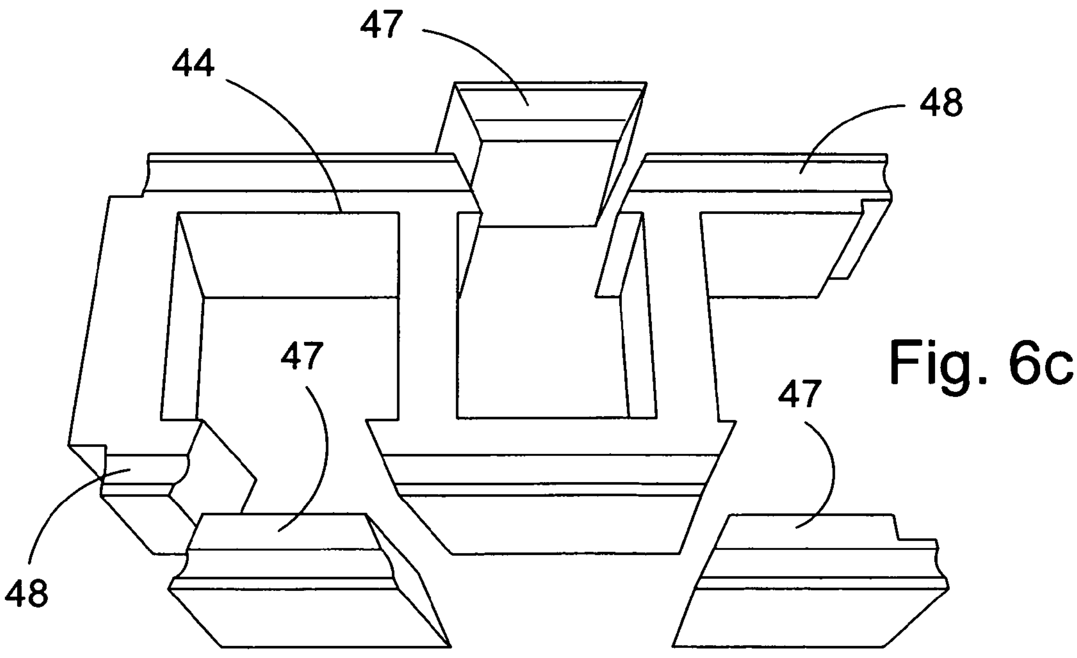
Fig. 6c

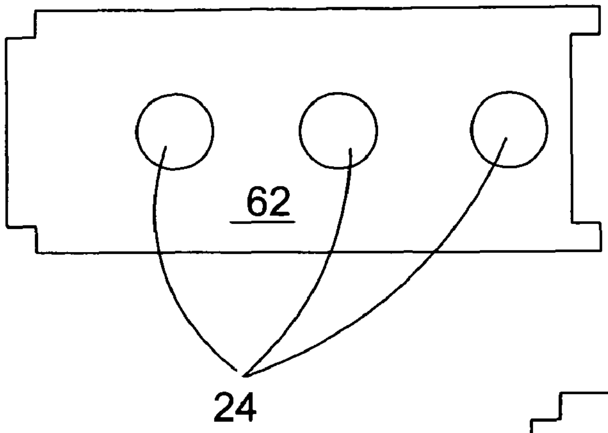
Fig. 15a
Fig. 15b
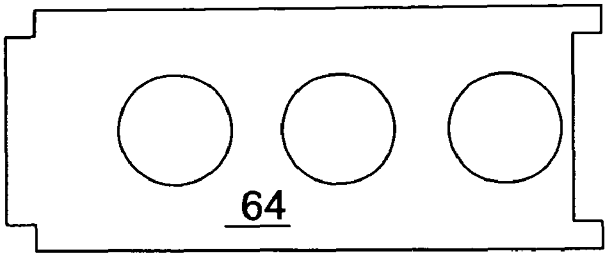
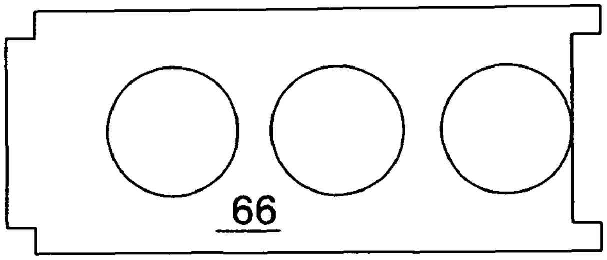
Fig. 15c
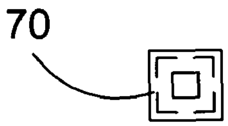
Fig. 15e
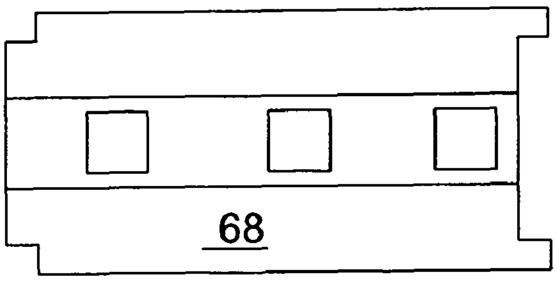
Fig. 15d

COKE OVEN RECONSTRUCTION

TECHNICAL FIELD

The present invention relates to a coke oven reconstruction, and more particularly to a new, faster and more efficient way to reconstruct heating walls and ceilings in coke oven batteries from the pusher side to the coke side, wherein large size cast monolithic modules having high dimensional stability, negligible expansion on heating, good abrasion resistance, good compressive strength and good thermal shock resistance in the range of −20° to 1565° Celsius are employed.

BACKGROUND OF THE INVENTION

Many coke oven batteries in the United States and around the world are in excess of fifty years old, which batteries were made to a large extent of silica bricks. As they age the silica brick heating walls begin to degrade, and they need repairs ranging from patching and spraying of material to prevent further cracking and to slow down the degradation that is taking place to replacing an end portion of a heating wall. Eventually the heating walls will need to be replaced. Historically, replacing entire heating walls involves constructing a new heating wall of silica bricks, a process that may involve laying in excess of 4000 silica bricks and may take up to two months or longer to complete. There can be over a hundred different shapes of silica bricks, and there are often problems with suppliers of the silica bricks that result in a relatively high percentage of broken bricks, further slowing down the process. Bricks made from a refractory repair mix are somewhat better, in that a smaller percentage of the bricks arrive broken, but there are still thousands of bricks to be laid in hundreds of different shapes, resulting in a long down time and a high expense. Large size, thermally stable blocks or modules of a non-expanding material have been developed, but these had only been used for endwall repairs, meaning that when heating wall replacements had to be done, they were done with smaller bricks.

OBJECTS AND SUMMARY OF THE INVENTION

It is an object of this invention to reconstruct heating walls and ceilings from the pusher side to the coke side of a coke oven battery made of silica bricks in a cost effective manner, wherein the reconstructed walls and ceilings will outperform the walls and ceiling which they have replaced.

More particularly, it is an object of this invention to use the large size cast modules in a heating wall replacement and to use large size cast blocks in a ceiling replacement, which modules and blocks are made of material which will provide monolithic modules having high dimensional stability, negligible expansion on heating, good abrasion resistance, good compressive strength and good thermal shock resistance in the range of −20° to 1565°. By using the large size modules and blocks of a thermally stable material the repair time is approximately halved, and costs are cut substantially also. In addition, the new heating walls will outperform the walls which they replaced.

The above objects and other objects and advantages of this invention will become apparent after a consideration of the following detailed description taken in conjunction with the accompanying Figures.

BRIEF DESCRIPTION OF THE FIGURES

FIG. 6*a* shows the top view of a repair module which is used with this invention.

FIG. 6*b* shows an end view of a repair module, showing the tongue-and-groove configuration.

FIG. 6*c* shows the module of FIG. 6*a* after clean out ports have been cut-out, and the cut-outs or plugs which will be subsequently mortared back in place.

FIGS. 15*a*-15*d* show bottom views of ceiling modules used in the ceiling reconstruction shown in FIG. 14.

FIG. 15*e* shows a sliding block which is used with the sliding ceiling module shown in FIG. 15*d*.

DETAILED DESCRIPTION

In General

Figure 1:
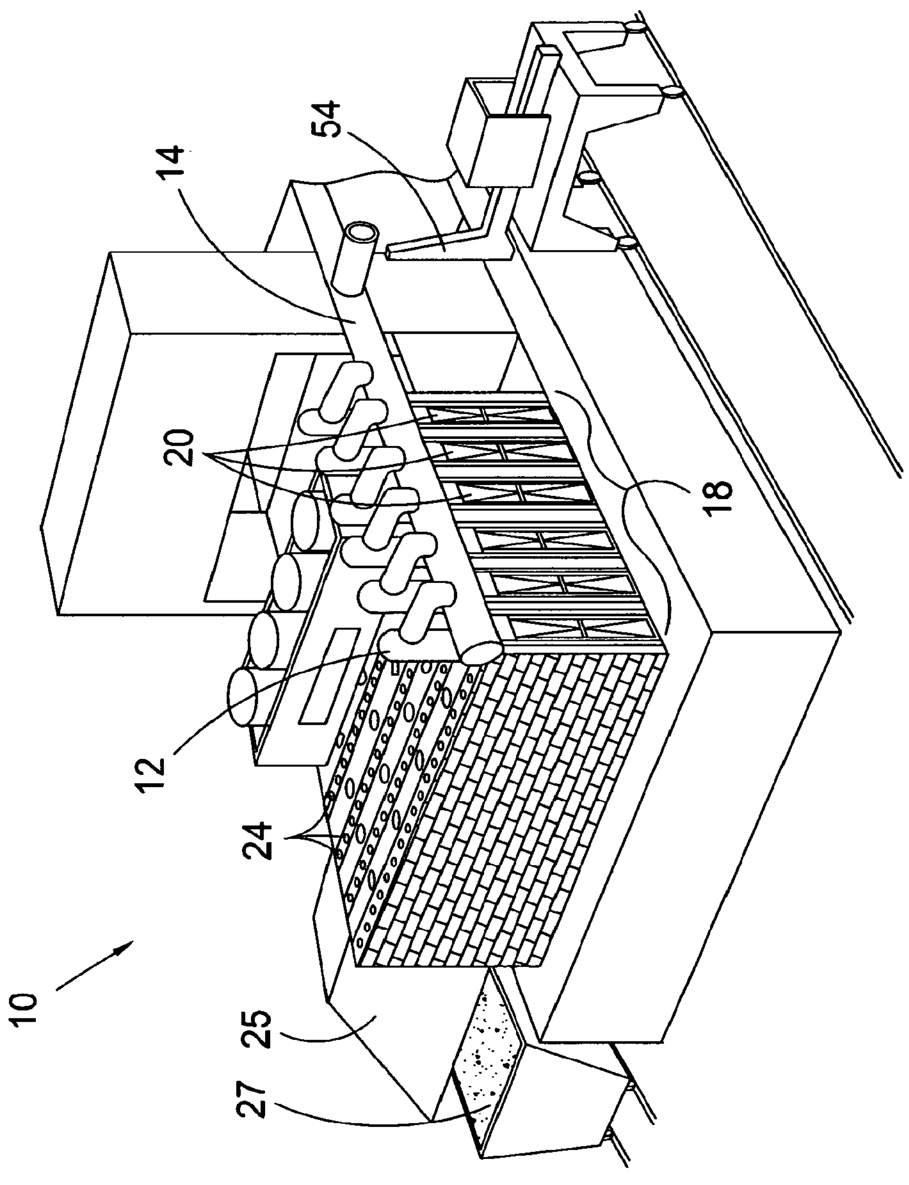
FIG. 1 is a somewhat schematic perspective overall view of a coke oven battery, parts having been removed and simplified for purposes of clarity.
Figure 12:
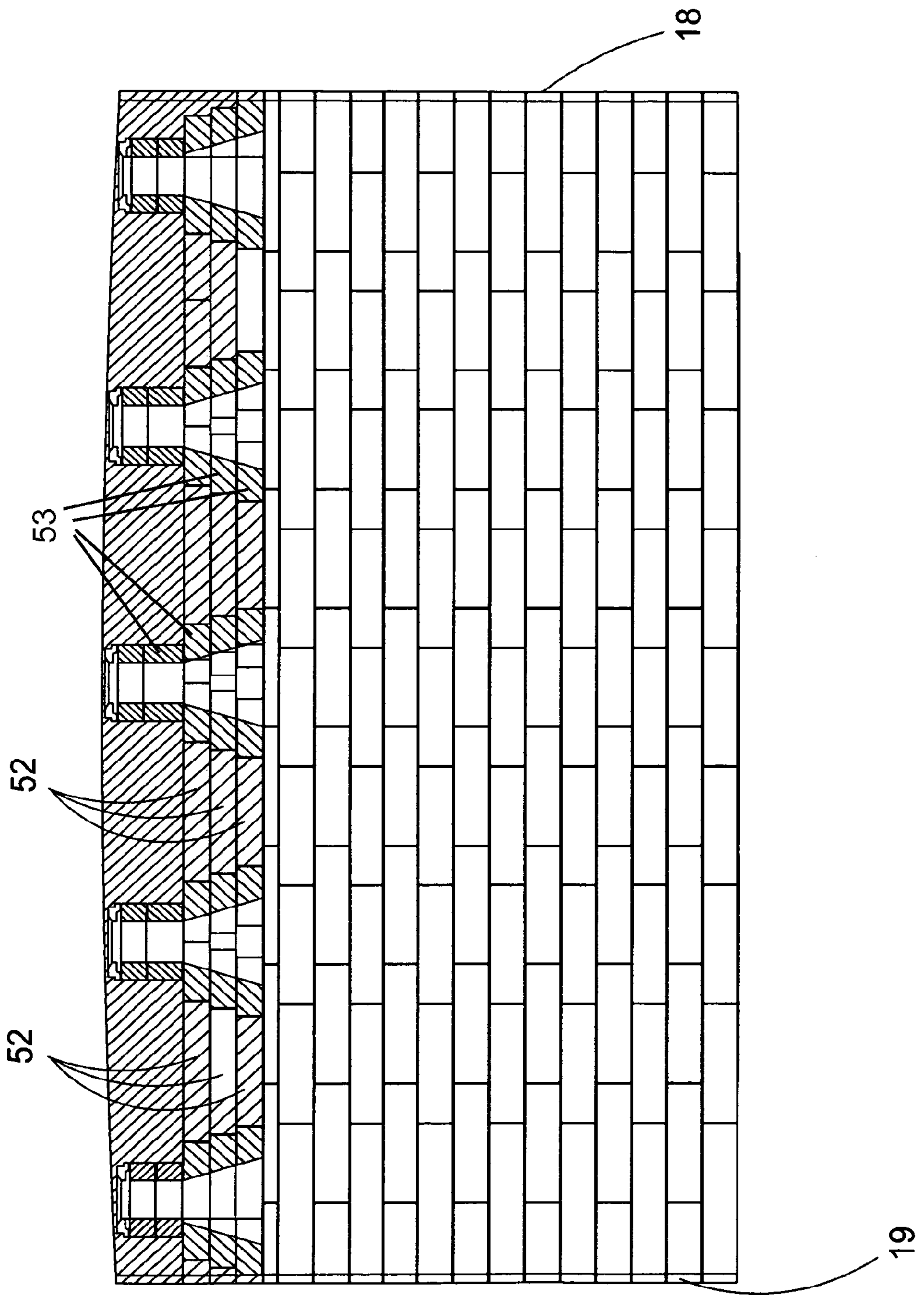
FIG. 12 is a sectional view taken generally along the line 12-12 in FIG. 11, showing a coking chamber which has been reconstructed in accordance with the principles of this invention.

FIG. 1 shows an overall view of a portion of a conventional coke oven battery. The battery is indicated generally at 10. Volatiles driven off during the coking process flow from standpipes 12 to a collector 14 for further processing. The coke oven battery includes a plurality of coking chambers 16 (FIG. 2), each chamber extending the length of the battery from the pusher side 18 to the coke side 19 (FIG. 12). Each coking chamber is slightly tapered and is provided with fully removable doors on the two opposing ends, with the taper widening from, for example sixteen inches at the door 20 (FIG. 2) on the first or pushing side to nineteen inches at the door (not shown) on the second or coke side. Each coking chamber may be 15 meters in length and may have a height of 3 to 6 meters, though these dimensions vary for different coke oven batteries.

Figure 2:
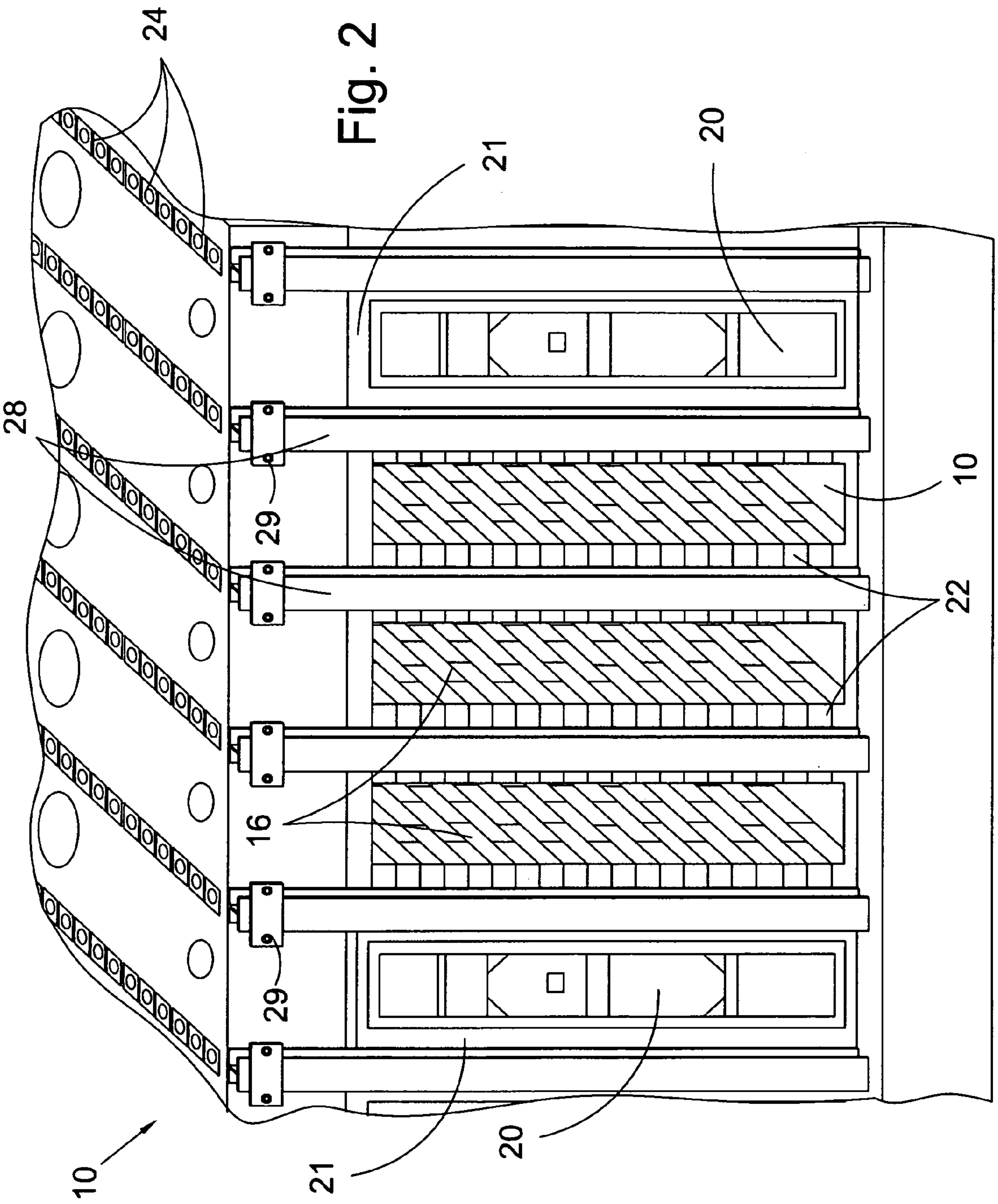
FIG. 2 shows a perspective view of the front portion of a coke oven battery with three adjacent doors removed.

The coking chambers 16 are separated from each other by heating walls indicated generally at 22 in FIG. 2. In a conventional battery, the heating walls are formed from rows or courses of silica bricks, with hundreds of bricks to each course. Each heating wall has a plurality of flues 30 (FIG. 8*d*), which terminate in upper apertures 24, which flues typically are alternated between heating cycles and drafting cycles. Gas and heated air are introduced into the flues through gas nozzles 57 and air ports 58 in air/gas port modules 59 at the bottom of the flues. FIGS. 4 and 5*a*-5*d* show the air/gas port modules 59 which are disposed below the heating walls, each module having an air port 58 and a tapered gas port 56 which receives a gas nozzle 57. The air and gas are ignited, the burning gas in turn heating the heating walls to a temperature typically in the range of 2100 degrees to 2500 degrees Fahrenheit (1150 degrees to 1370 degrees Celsius).

When the coking cycle for a particular coking chamber is completed, the doors are removed by a door mechanism, not shown, and than a pusher ram 54 is introduced from the pusher side into the coking chamber to push the coke from within the coking chamber, the coke being discharged through a coke guide 25 and then into a quenching car 27. It should be noted at this point that the foregoing structure of the coke oven battery and manner of operation of it are well known in the art.

An on-going problem in the operation of a coking oven battery is the progressive deterioration of the heating walls between the coke oven chambers. In the past it has been the practice to initially repair a heating wall by spraying the surface with a suitable slurry of sprayable refractory gunning material. While this will slow down the deterioration of the wall surfaces of the coking chamber, eventually it will be necessary to rebuild at least an end portion of the heating wall, and eventually it may become necessary to reconstruct an entire heating wall. Repair or reconstruction of the wall is done by shutting off the air and gas flow to the heating wall so that there is no combustion within the flues, insulating the area which is to be repaired or replaced by placing wall insulation on the surface of the adjacent heating walls. The wall is repaired or replaced with either new silica bricks or bricks made from a refractory repair mix. Because of the large number of bricks which are employed in a heating wall, this is a very time-consuming process, typically taking approximately 2 to 3 weeks for an end wall repair, and 6 to 8 weeks or longer for the reconstruction of an entire heating wall.

To overcome the drawbacks of standard bricks, a large size cast monolithic refractory repair module has been developed. These modules are disclosed in U.S. Pat. No. 5,423,152. Each module is formed from a refractory mix of the type which, when set and properly fired, has a high dimensional stability and good thermal shock resistance in the range from 0 degrees to 2850 degrees Fahrenheit (−17 degrees to 1566 degrees Celsius). In addition, the surface of the modules is resistant to abrasion such as may be present during the push of coke from the coking chamber at the end of the coking process. Each large size cast monolithic refractory module encompasses at least one entire flue from one side of the heating wall to the other side, and may encompass two or more flues, with three flues being typical for a mid-wall module. Each large size cast module is also the height of two courses of silica bricks. Thus, a typical silica brick is 6 inches in height, whereas the large size cast monolithic modules used in this invention are 12 inches in height. Thus, one course of modules replaces two courses of bricks. Other cast repair blocks may be used in ceiling repairs which ceiling blocks are also made from the same or a comparable refractory mix. Thus, a variety of novel cast repair modules and blocks are provided for use in the repair of heating walls between coke oven chambers and for the repair of ceilings above the coking chambers defined by the adjacent heating walls. However, prior to this invention, these modules and blocks have been used only for repairing end walls on coke ovens.

Process for Replacing Heating Wall

In the following description and in the claims the term large size cast module refers to a module formed from a refractory mix of the type which, when set and properly fired, has a high dimensional stability and good thermal shock resistance in the range from 0 degrees to 2850 degrees Fahrenheit (−17 degrees to 1566 degrees Celsius), the surface of the module being resistant to abrasion such as may be present during the push of coke from the coking chamber at the end of the coking process, and the large size module including at least one flue, and perhaps as many as three flues, and extending from one side of a heating wall to the other side of the heating wall. In addition each large size cast module has a height equal to the height of two course of silica bricks. The term large size cast block refers to a block used in a ceiling repair which is formed from a refractory mix of the type which, when set and properly fired, has a high dimensional stability and good thermal shock resistance in the range from 0 degrees to 2850 degrees Fahrenheit (−17 degrees to 1566 degrees Celsius).

Figure 4:
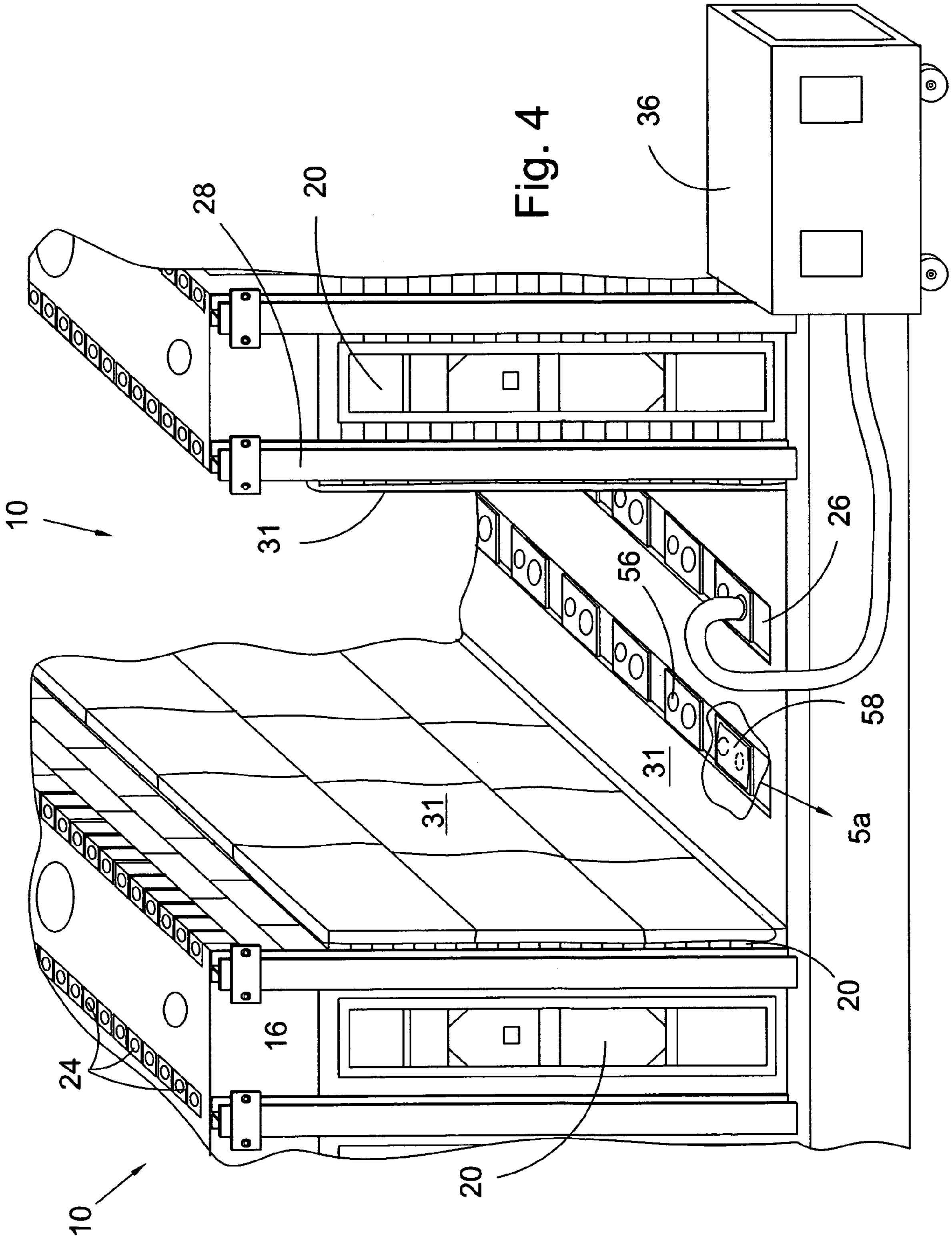
FIG. 4 is a perspective view of the coke oven battery showing the air and gas ports on the right being vacuumed with heavy-duty industrial vacuuming equipment, and the front air and gas ports on the left being covered, the floor and walls being covered with insulation material.

When replacing a heating wall, a number of preliminary steps are made which are not illustrated in the drawings as these are conventional steps used when replacing a coke oven wall with silica bricks. Thus, the coke oven doors 20 and door frames 21 are removed at the ends of the adjacent coking chambers 16. As shown in FIG. 4, insulation 31 is applied to the sides of the nearby heating walls 22 which are not being reconstructed, and insulation 31 may also be applied to the floor 26. Also, for convenience in the reconstruction and to facilitate the introduction of the large size repair modules into the area to be repaired, the buckstay 28 at each end of the heating wall is cut off at the floor level and removed, along with the associated tie rods 29.

As set forth above, the modules to be used in the replacement of heating walls are large size cast monolithic modules 44 best shown in FIG. 6*a*. The oven is carefully measured, and the modules 44 are individually constructed using a proprietary process in advance of the wall replacement. Due to the taper of the oven wall, each module 44 is built for a specific location or locations within the oven wall. The modules are made in such a configuration that each module typically defines a vertical portion of at least one flue 30, with three flues per module being typical, as shown in FIG. 6*a*. When stacked together and construction of the wall is complete, the openings that define the flue portions line up with one another to form flues, and each module is formed so that, when in place, each flue has a gas nozzle and an air port at the bottom of it. It should be noted that as the coke oven chamber has approximately a 3-inch taper, being 3 inches wider at the coke side than at the pusher side, it is also necessary to dimension the modules to take into account the taper of the coking chamber.

Figure 3:
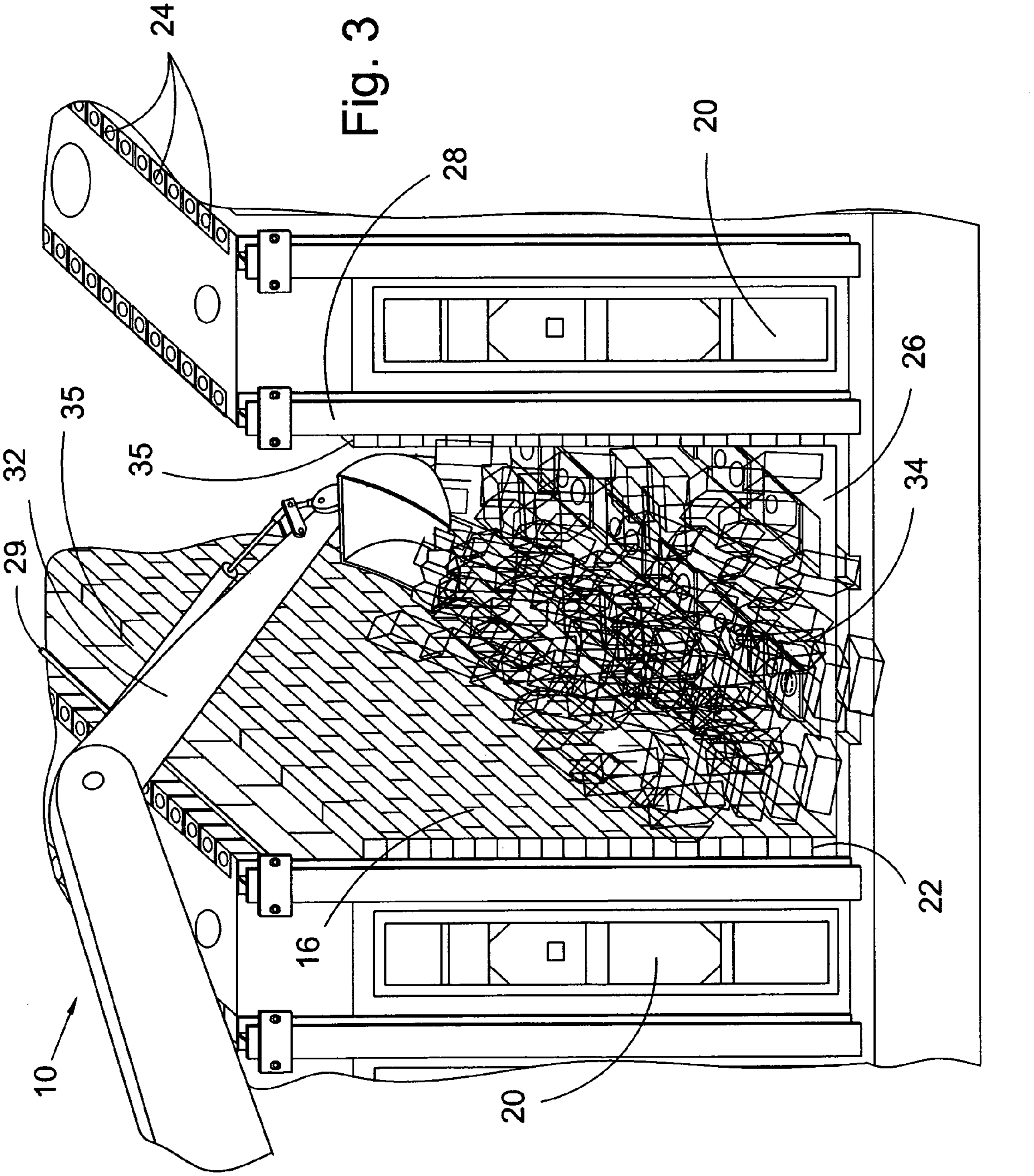
FIG. 3 is a perspective view of a portion of a coke oven battery showing the front portion of the coke oven shown in FIG. 2 after the buckstays adjacent the portion to be reconstructed have been cut-off and removed, and after the associated tie rods have been removed, and further showing the use of heavy equipment to demolish two adjacent heating walls in a coke oven.
Figure 5A:
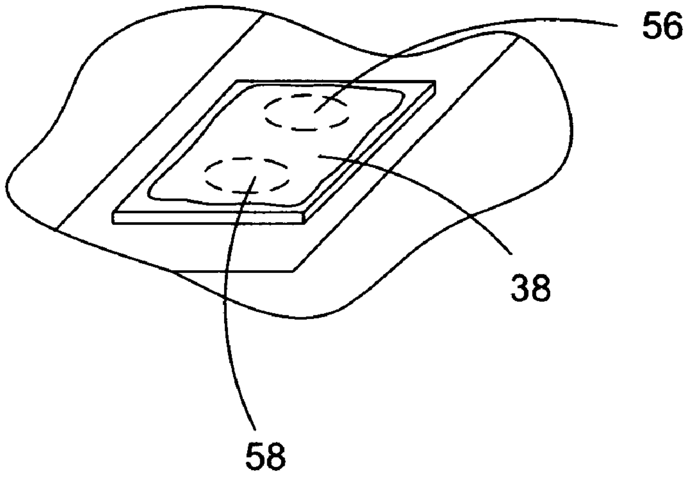
FIG. 5*a* is an enlarged portion of FIG. 4 showing the front air and gas posts on the left covered.
Figure 5B:
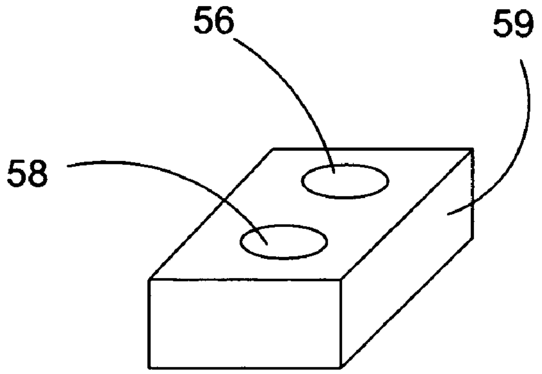
FIGS. 5*b*-5*d* are perspective, side, and sectional views, respectively, of air and gas port modules.
Figure 5C:
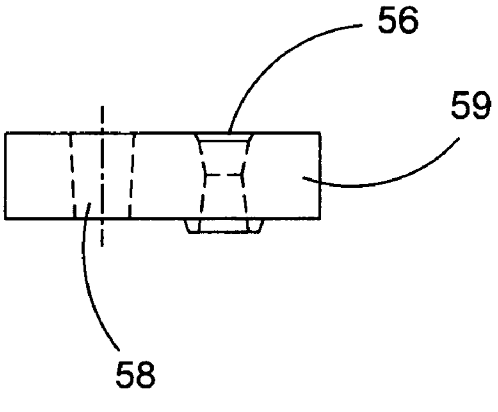
Figure 5D:
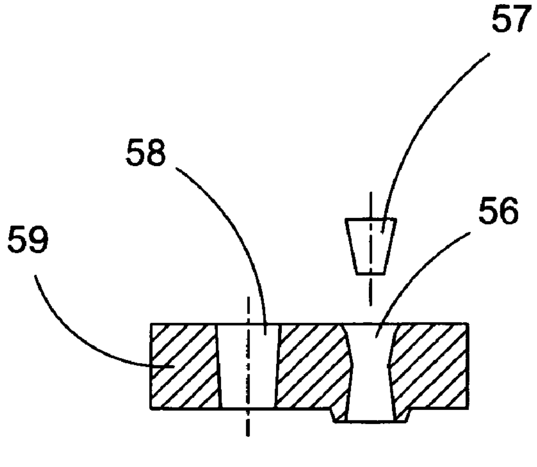

FIG. 3 illustrates a novel feature of this invention, in which heavy equipment 32 is employed to break down and remove the heating walls which are to be replaced along with the associated ceiling. While two walls are being shown being broken down, a single wall may be broken down, or more than two walls may be broken down. The brickwork is removed to the level of the floor 26 of the coking chamber. The heating walls of the adjacent coking chambers may be covered with insulation material 31 shown in FIG. 4 prior to the demolition of the walls which are to be reconstructed. Also, sheet metal may be laid over the insulation to further protect the adjacent heating walls during the demolition of the walls which are to be reconstructed. Once the debris 34 has been removed from the interior of the oven, heavy duty vacuuming equipment 36 as schematically shown in FIG. 4 is used to vacuum any remaining debris from the gas nozzles 56 and air ports 58 in the floor. After it has been ascertained that the gas nozzles 56 and air ports 58 are clear and free of debris, they are covered with sheet material such as a heavy paper, aluminum sheets, or an equivalent layer 38 of a sufficient strength to prevent any mortar from falling into the nozzles and plugging them up, and the paper or layer is fastened in place, as shown in FIG. 5*a*. At this time, the adjacent walls are insulated, if this has not been done earlier.

Figure 7:
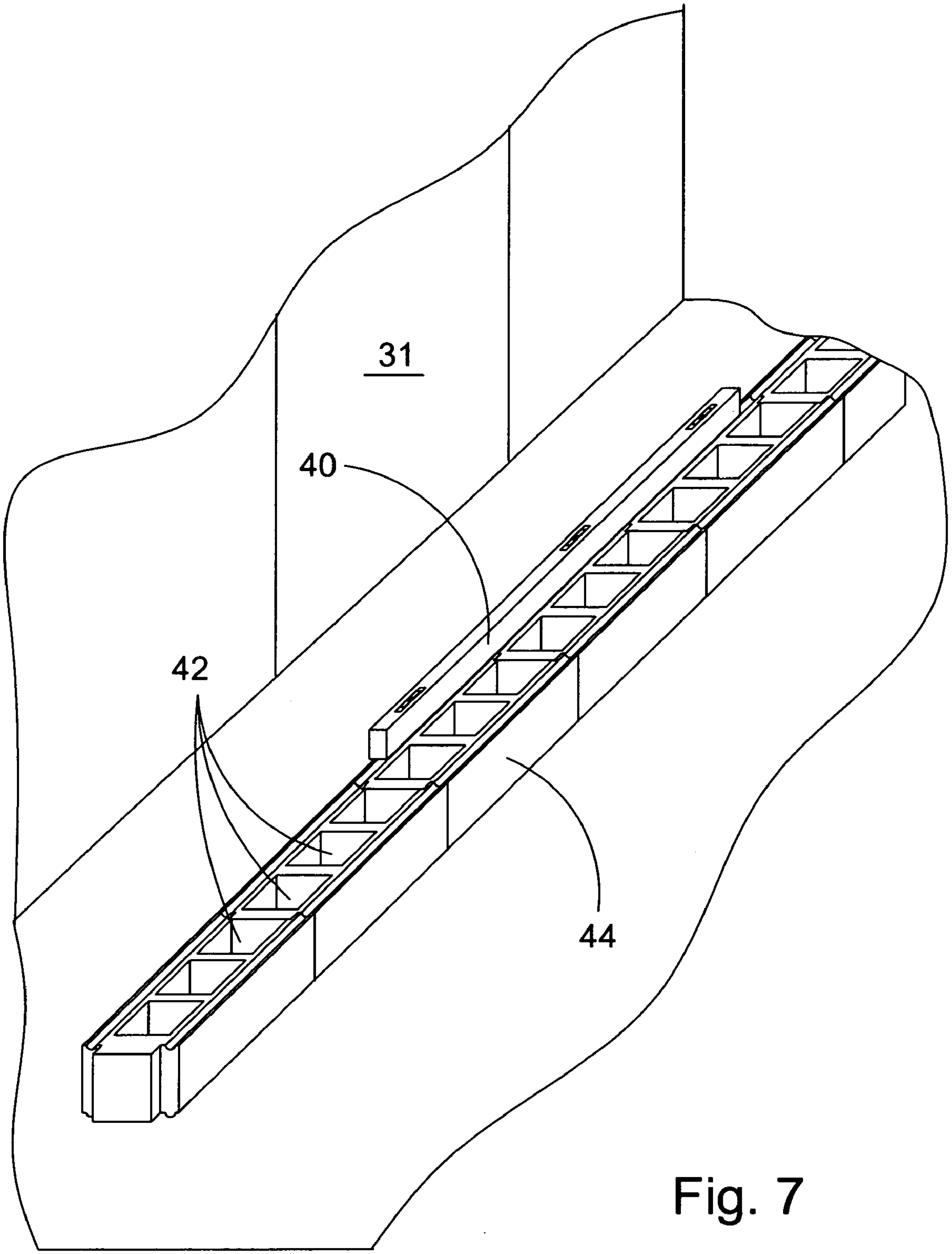
FIG. 7 is a perspective view showing the first row of modules being leveled.

The floor is then carefully measured to see how level it is. If it is relatively level, for example, by not having a more than 1½ inch variation over the length of the oven, the first course of modules 44 is laid as shown in FIG. 7. To this end, proper measurements are set between the first course of modules and the existing walls to insure proper taper of the oven. The first course of modules are selected from the large size modules which have been cast for this reconstruction, and the selected modules are then laid by using heavy equipment such as a crane to place them, then leveling and aligning the course. If the floor is relatively level, the first and second course can be mortared in such a manner that the top surface of the second course (FIG. 8*a*) is level. In this regard, up to ¾ inch of mortar may be applied between the bottom of the first course and the floor, and also up to ¾ inch of mortar may be applied between the first and second course. The mortar between additional course is preferably no more than ¼ inch thick.

The first course may be provided with clean out ports 46. To this end, plugs 47 are cut out, which plugs are provided with suitable indicia so that they may be mortared back into their original location after clean-out and before the wall is fired. In some situations, the floor 26 is not sufficiently level to lay a first course of large size modules. When this happens, the first course may be made up of floor wings 39 and suitable end caps 41, the bottom of which may be cut with a masonry saw so that the tops form an essentially level surface. Levels 40 help maintain level installation as shown in FIG. 7, and would also be used with floor wings 39.

After the first (or second) course is laid, vertical story poles 60 (FIG. 8*c*) are secured each end of each course and a guide is attached to maintain the proper alignment. In this and subsequent layers, the modules are fabricated and laid so that the vertical seams between the modules do not line up with the seams in the row immediately below. While a pair of story poles are shown at the ends of two adjacent courses, a single vertical story pole may be used at each end, in which case horizontal bars may be employed, the horizontal bars being provided with eyelets or the like to which the guide strings are secured to maintain proper alignment.

Figure 8A:
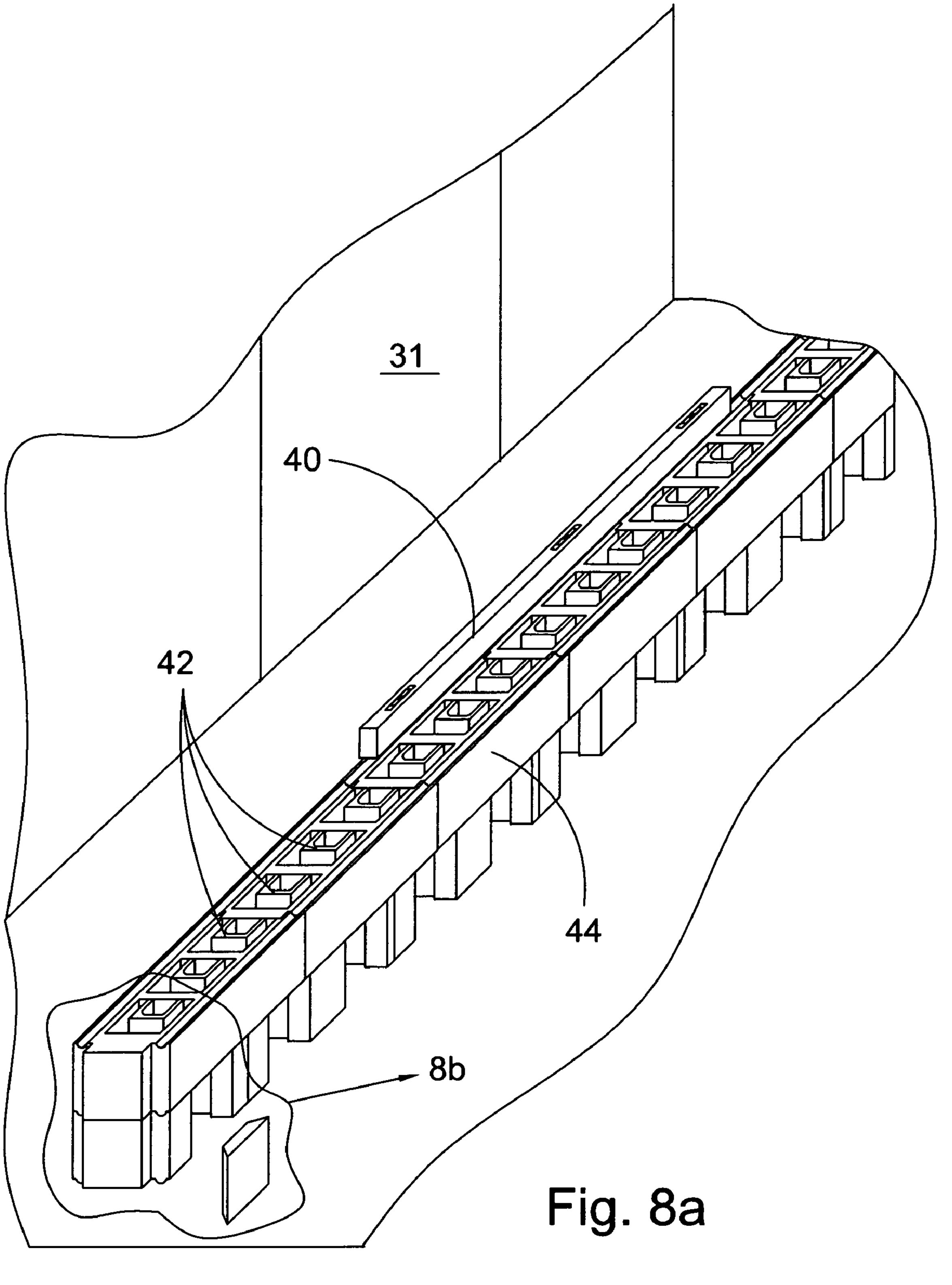
FIG. 8*a* is a perspective view showing the first two rows of modules and the clean-out ports in the first row of modules, and with the secondary air stacks installed.
Figure 8B:
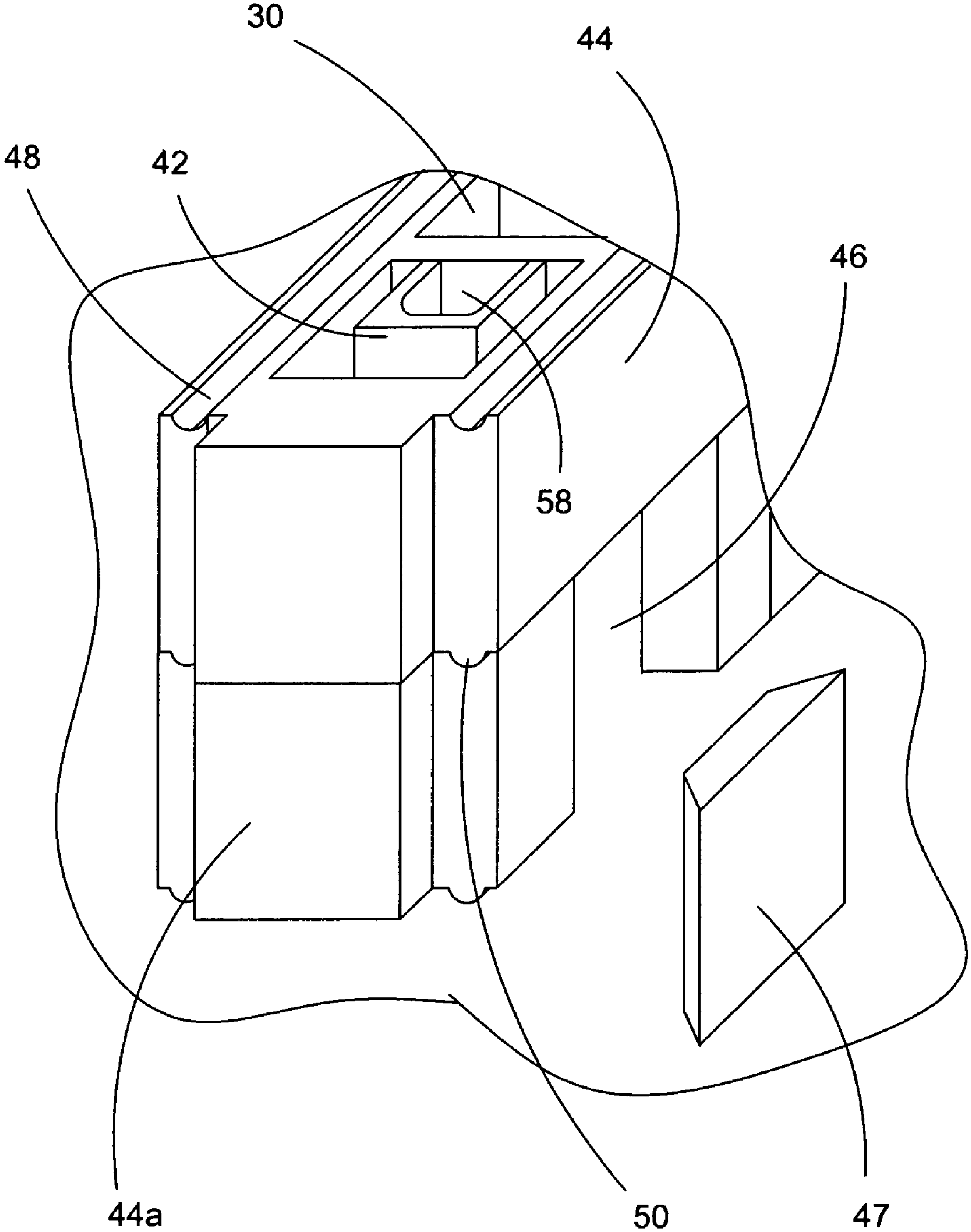
FIG. 8*b* is enlarged perspective view of a portion of FIG. 8*a*.
Figure 8C:
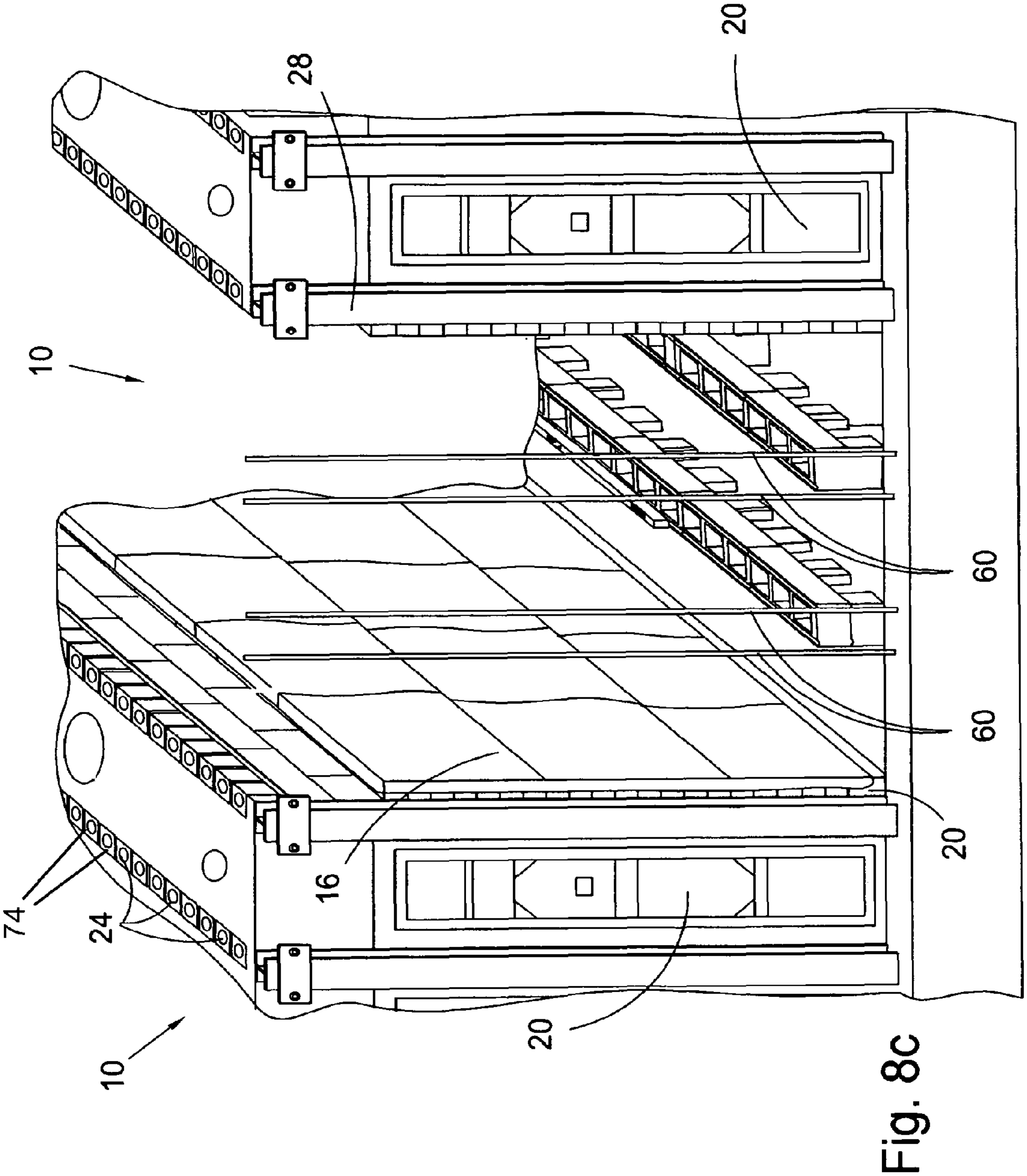
FIG. 8*c* is a perspective view showing two coke oven heating walls rebuilt with the first two course of modules, this view also showing vertical story poles which have been erected to assist in the aligning and leveling of the modules.

Secondary air stacks 42 may be installed in the modules of the first two courses as they are laid as required, as shown in FIG. 8*a*. The secondary air stacks are made of the same refractory material used in the manufacture of modules 44. Slots (not shown) can be cast into the module for the air stacks to be inserted into. The air stacks are then mortared in place. In all other respects except for dimensional differences related to their location in the oven, the remaining modules are essentially the same. They are generally similar in shape and dimensions to what has been described in U.S. Pat. No. 5,423,152.

The modules 44 fit together vertically with a tongue-and-groove construction, with the top surface of the first layer of modules provided with two longitudinal grooves 48 which each run the length of one of the sides, and the modules which correspond to layers higher than the first one within the oven have matching tongue-and-groove surfaces 50, 48 on the bottom and top surfaces, respectively, to reduce the possibility of emissions as best shown in FIG. 61.

Figure 8D:
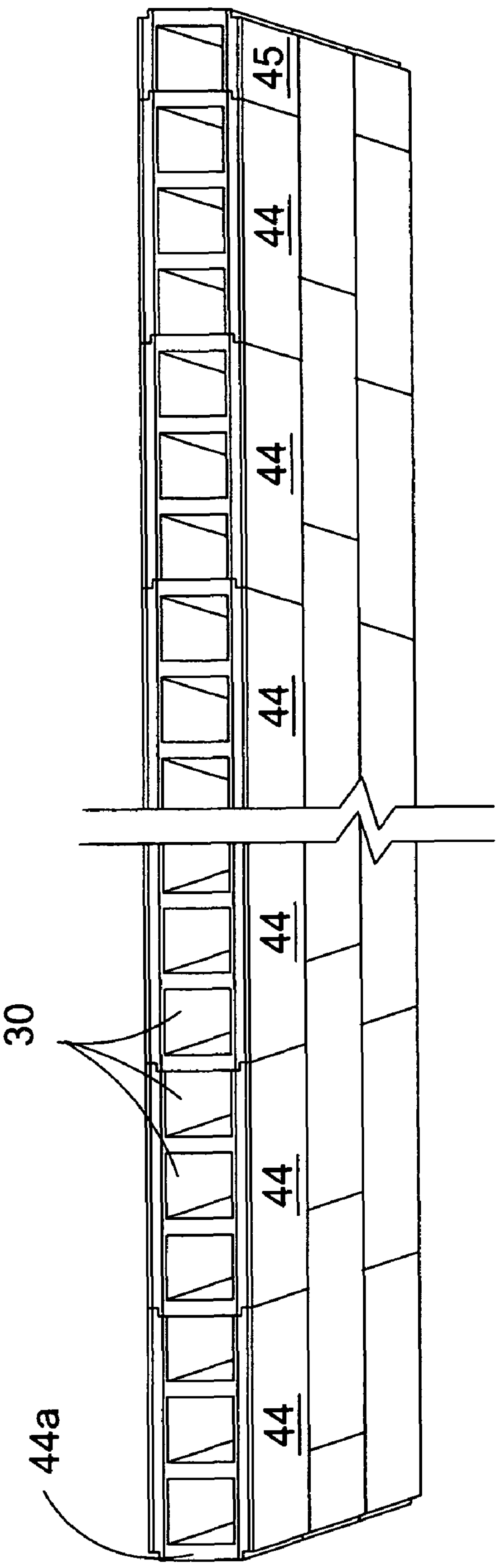
FIGS. 8*d* and 8*e* are views of the entire length of a heating wall during reconstruction, FIG. 8*d* showing an odd course of modules installed on the top of the heating wall under reconstruction, and FIG. 8*e* showing an even course of modules installed on the top of a heating wall under reconstruction.
Figure 8E:
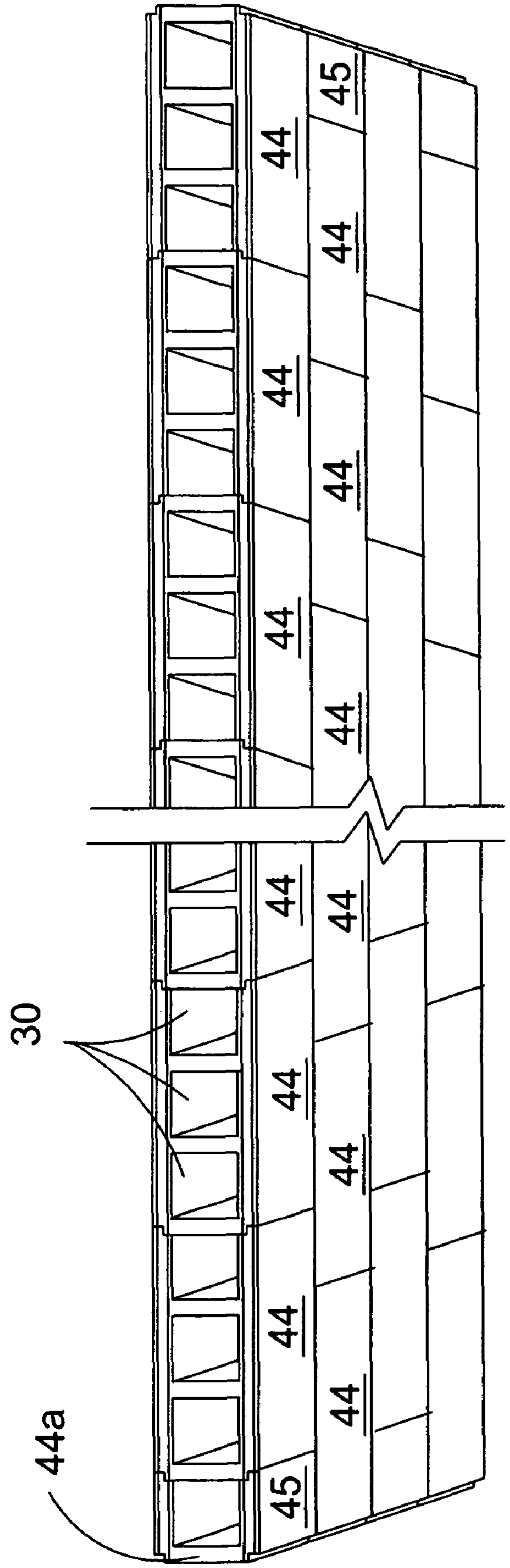

As can be seen from FIGS. 8*d* and 8*e* each course includes a plurality of multiple flue large size cast modules and one end large size cast module which only incorporates a single flue. Thus in FIG. 8*d* which shows the third course of large size cast modules used in the reconstruction of a heating wall, it can be seen that there are 8 large size cast modules 44 which each incorporate 3 flues, and in addition there is a single large size cast module 45 which is disposed at an end, in this case the pusher side, which module incorporates only a single flue. In FIG. 8*e*, which illustrates the even course, it can be seen that there are 8 large size cast modules 44 which each incorporate 3 flues, and in addition there is a single large size cast module 45 which is disposed at an end, in this case the coke side. In each of these courses, 7 of the 8 large size cast modules are of essentially the same design, although they are of progressively decreasing width from the pusher side to the coke side. However, one of the large size cast modules 44 incorporates a nose portion 44*a* which is adapted to be disposed adjacent a buckstay 28. In both the even courses shown in FIG. 8*e* and the odd courses shown in FIG. 8*d*, there is a further large size cast module 45 which incorporates only a single flue, these modules 45 also incorporating a nose portion which is adapted to be disposed adjacent a buckstay. The reason that the odd and even course alternate with the module 45 being disposed first on the pusher side and then on the coke side is so that ends of the modules 44 overlap other modules to reduce emissions, and to improve the stability of the heating wall that is being reconstructed.

Figure 7A:
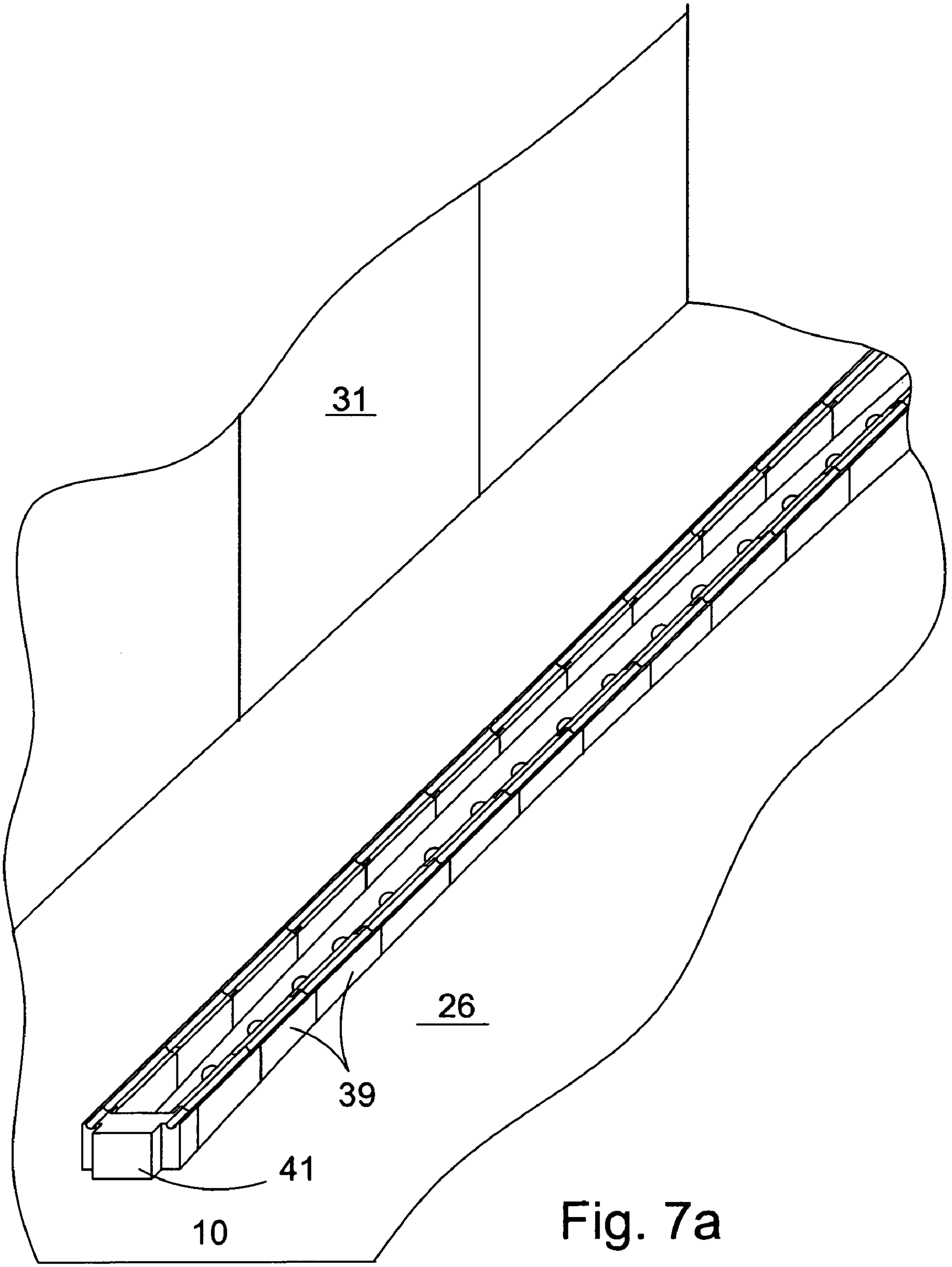
FIG. 7*a* shows an alternative first course used with floors which are not near level.
Figure 9:
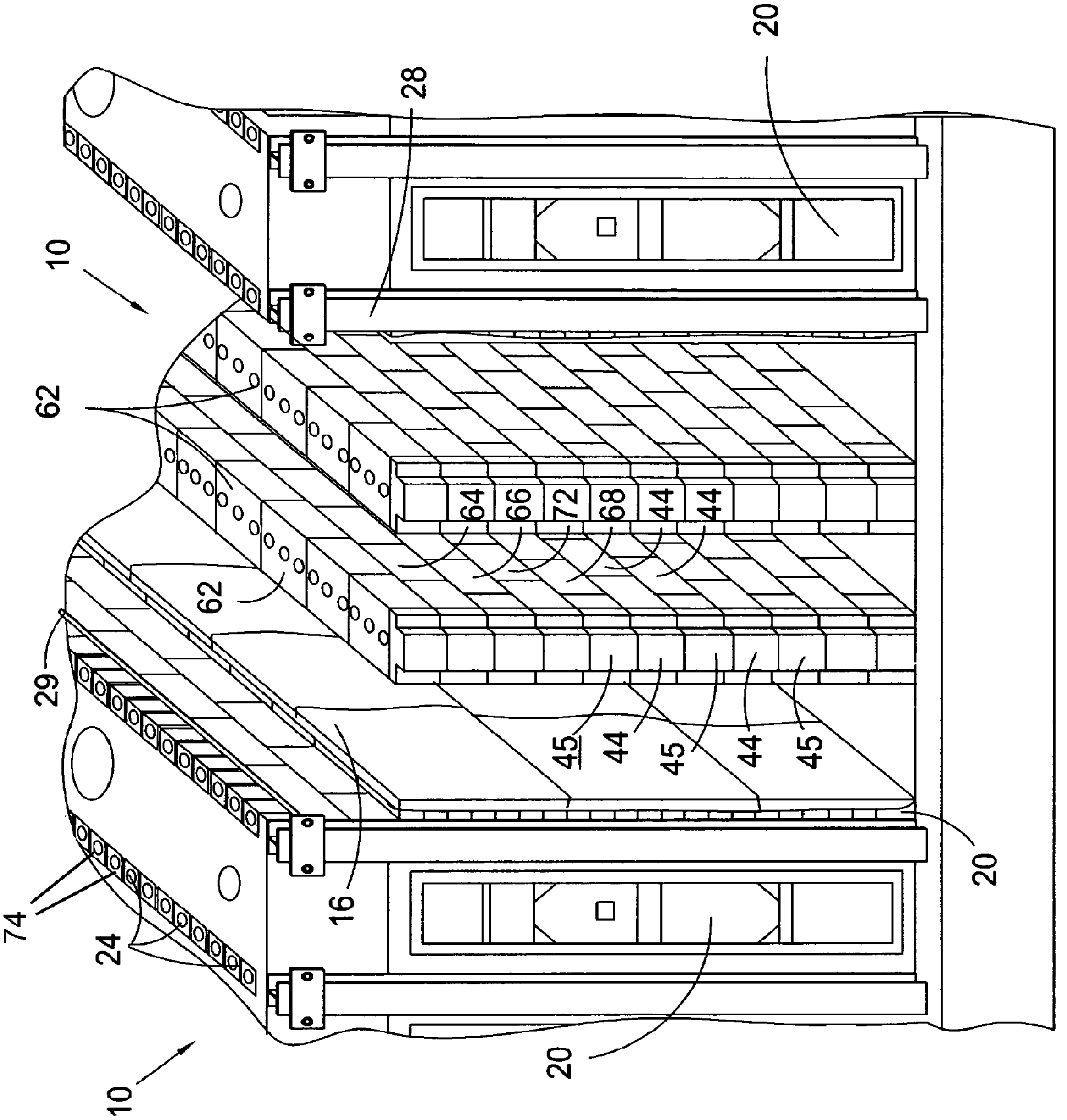
FIG. 9 is a schematic view similar to FIG. 8*c*, but showing the heating walls rebuilt to ceiling height, and prior to the installation of ceiling blocks, the story poles having been removed, and only a few course of large size cast modules being illustrated for simplicity purposes.
Figure 14:
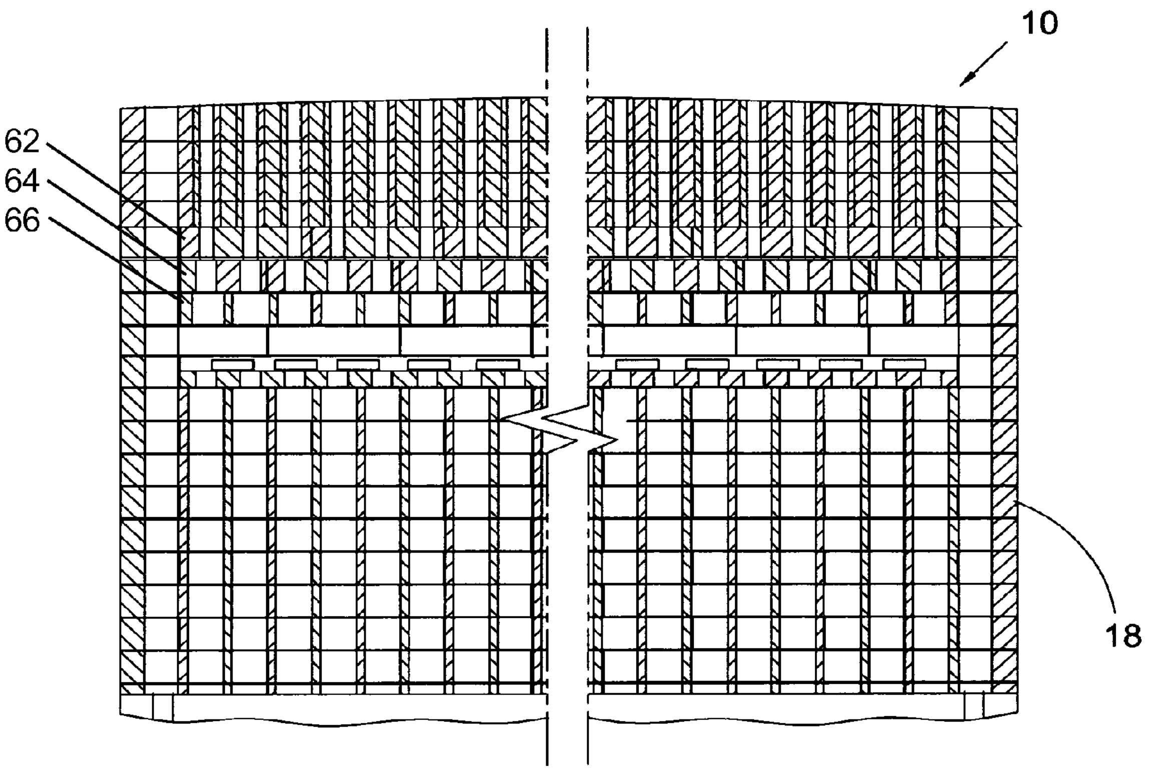
FIG. 14 is a sectional view taken generally along the line 14-14 in FIG. 11, showing a heating wall and the ceiling above it which have been reconstructed in accordance with the principles of this invention.

As many courses are laid as is necessary to replace the walls to ceiling height, only a few being illustrated in FIG. 9. As the lower portions of the walls are completed, the walls have enough integrity to support scaffolding, to allow easier construction of higher portions of the walls. With reference to FIGS. 14 and 15, each wall reconstruction is finished off with, going from top down, transitional modules 62, 64, 66, wing modules 72 similar to the wing modules 39 shown in FIG. 7*a*, and sliding block modules 68 which receive sliding blocks 70. It should be noted that each of the large size cast modules 44, the transitional modules 62, 64, and 66, and the sliding block modules 72 replace a large number of silica bricks. For example, the sliding block modules and each of the modules 44 replace 27 silica bricks.

Figure 10:
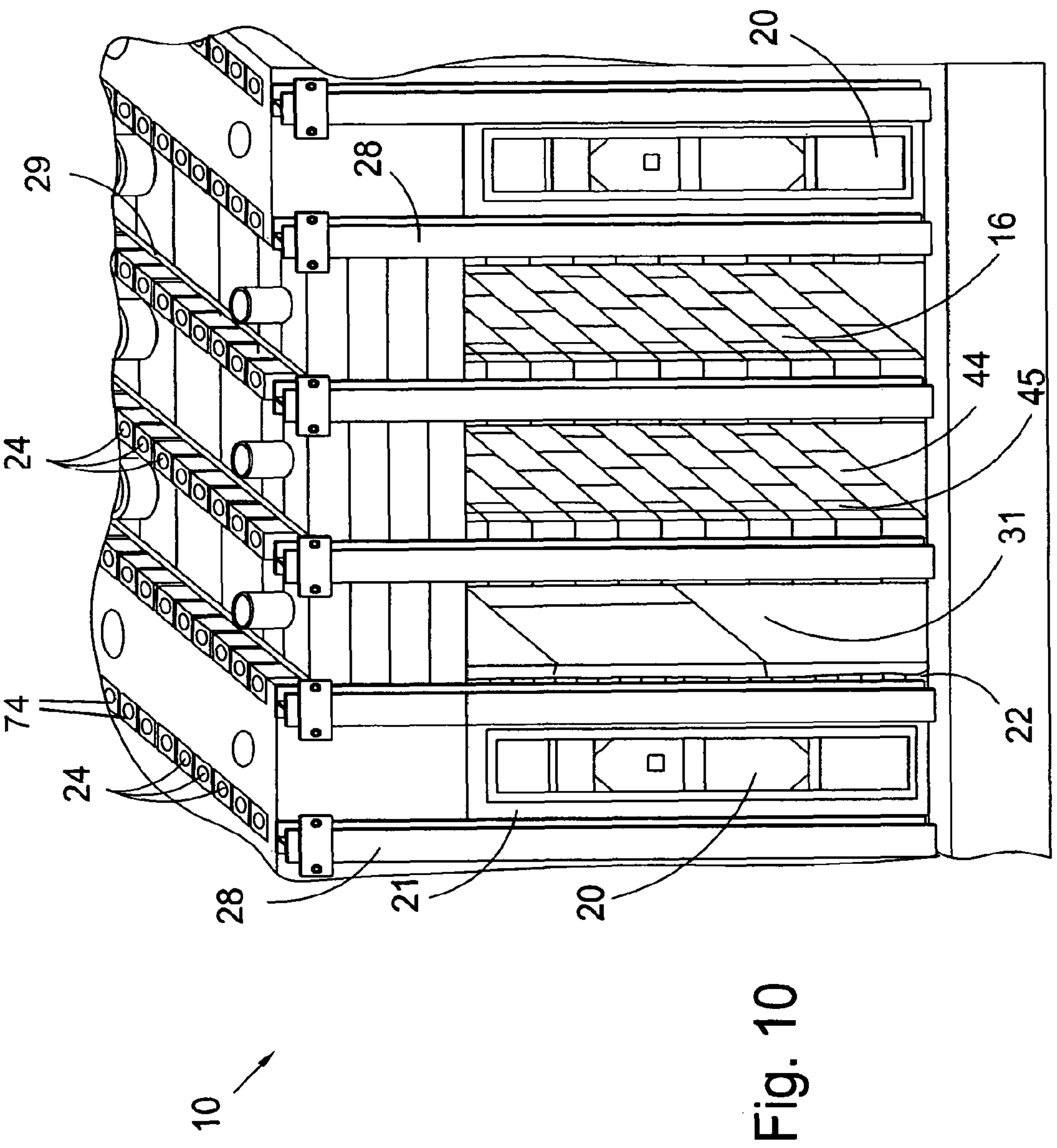
FIG. 10 shows a perspective view of a partial coke oven battery with two completed heating walls of modules, and with ceiling blocks in place.
Figure 11:
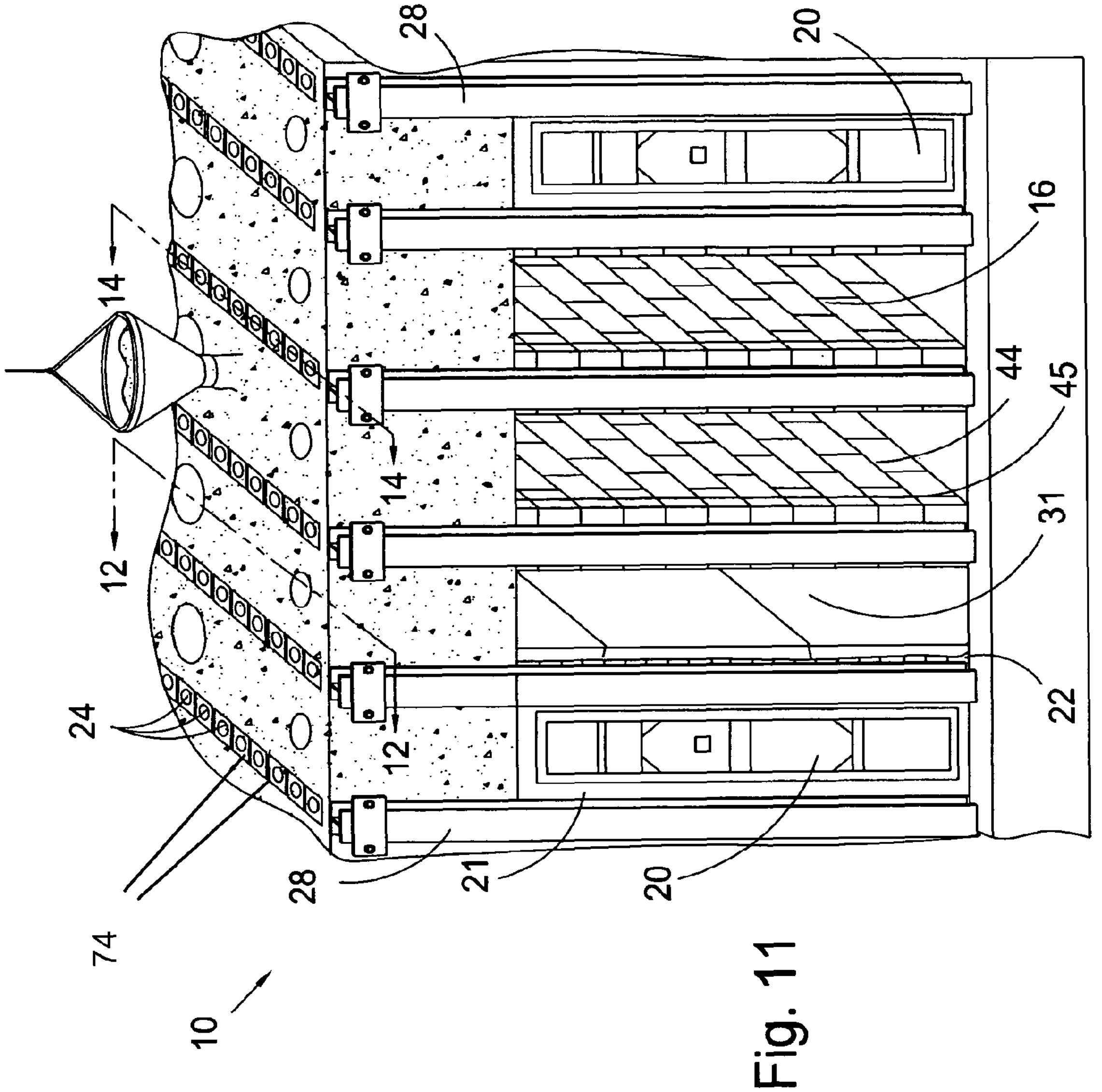
FIG. 11 is a perspective view of a portion of a coke oven battery in which two heating walls and the ceiling have been reconstructed with large size modules and blocks, with the top of the ceiling being poured with high temperature castable material.
Figure 13C:
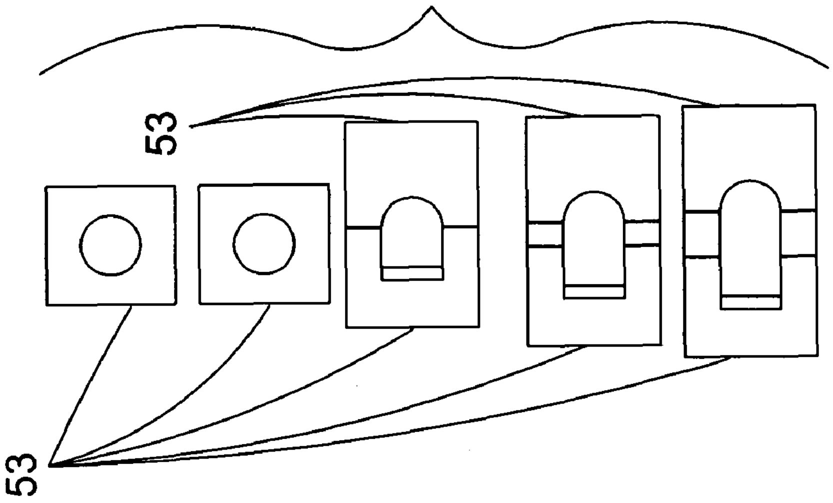
FIGS. 13*a*-13*c* bottom views of various ceiling blocks, FIG. 13*a* illustrating blocks used for forming a smoke hole, FIG. 13*b* illustrating blocks used for forming charge holes, and FIG. 13*c* illustrating blocks used for forming a gas take off.
Figure 13B:
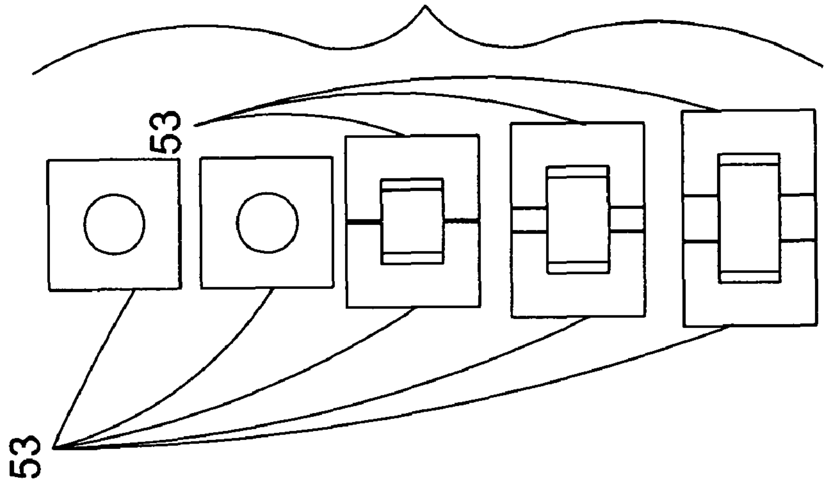
Figure 13A:
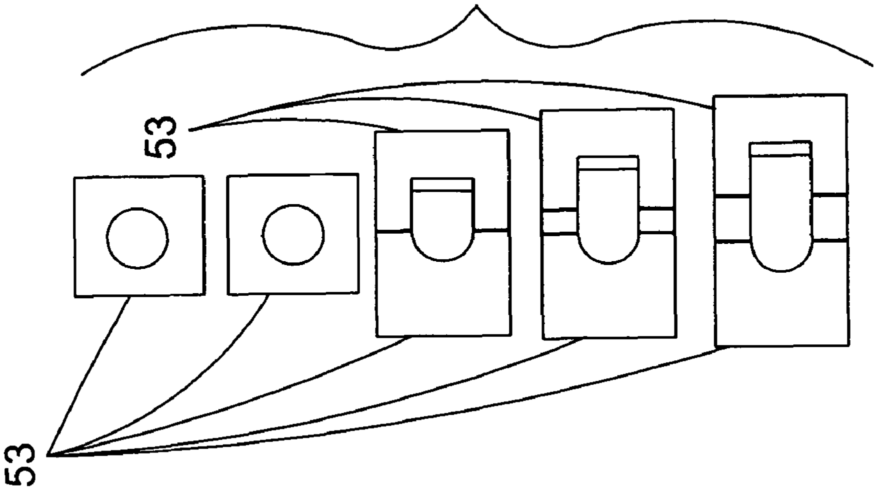

After the heating walls have been replaced to the ceiling height, the top transition module 62 has its upper surface essentially at the bottom level of the ceiling. It is now necessary to rebuild the ceiling portion of the coke oven battery, not only above the heating wall that has been replaced, but also between the heating wall and other adjacent heating walls. This first course of the ceiling includes first large size generally rectangular bridging ceiling repair blocks 52 made of the same refractory material used in the modules 44 to produce a thermally stable, non-expanding cast block. The ceiling blocks also include various blocks 53, some of which (FIG. 13*c*) are shaped in such a way that they will form a passageway for the passage of gases from the coking chamber to a standpipe 12 which is to be disposed above the ceiling. Others (FIG. 13*a*) form apertures for a smoke hole. And others (FIG. 13*b*) form apertures for charging the coking chambers. The shape and size of each ceiling block which forms an aperture above the coking chamber can be seen from FIGS. 13*a*-13*c*, and it should be noted that each of the cast blocks has the same width. It should be noted that in FIG. 10, four apertured bridging ceiling block courses are shown, whereas in FIGS. 13*a*-13*c*, only three bridging apertured ceiling blocks are shown. This is because differing batteries will require differing numbers of bridging ceiling blocks, typically 3-5 courses. Each of these ceiling blocks is adapted to rest upon the top surface of the ceiling block or ceiling blocks below them, and they will extend slightly above the heating chamber, as their width is greater than the width of the coking chamber. It should be noted that each of the original walls adjacent the walls being reconstructed are provided with a ledge 35 FIG. 3), and the lowermost ceiling blocks will have one side which rests on the ledge, and the other side of the lowermost ceiling block will rest on the transitional course 62. Spaced between adjacent ceiling blocks on the transitional course are a plurality of flue blocks 74 which have the apertures 24.

The balance of the ceiling or roof may now be completed by laying up additional courses of flue blocks and ceiling blocks. The equivalent of the final one or two courses may alternatively be poured. This eliminates the necessity of using top papers and reduces top leakage. It should be noted that as the material used on the roof is not subject to either abrasion or to compressive loads, a number of suitable materials may be selected. High temperature castable material is preferred. The material can be mixed and pumped from the ground to the top of the battery, or other methods can be used such as mixing the castable on top of the battery. After pouring, the castable is leveled and floated to match the contour of the crown on the existing battery top, and to allow rain water to run off.

After the wall replacement, the buckstay is re-installed, as is the door frame, door, and bulkhead, and the insulation material is removed.

Another unique feature of this invention is the shortened heat-up time required after repairs. Traditionally, after a reconstruction using silica bricks, a heat-up time of up to nine days is required to allow for expansion before the first charge. However, after a wall replacement with large size cast modules and blocks, ovens only need to heat up to 48 hours, and more typically 24 hours before the initial charge.

While this invention has been described above and shown in the accompanying drawings, it should be understood that applicant does not intend to be limited to the particular details described above and illustrated in the accompanying drawings, but intends to be limited only to the scope of the invention as defined by the following claims.

What is claimed is:

1. A method of reconstructing a heating wall of a coking chamber in a coke oven battery from one end of the chamber to an opposite end, comprising:

a) laying a course of large size cast modules using thermally stable, non-expanding large size modular cast modules, each module having at least one vertical opening which defines a portion of a flue;

b) on a first course of large size cast modules, setting proper measurements between the large size cast modules and existing heating walls to insure proper taper of the oven;

c) leveling and aligning the course of large size cast modules using at least one of story poles and levels;

d) mortaring the large size cast modules into place;

e) repeating steps (a), (c), and (d) to install subsequent layers of large size cast modules to create a newly laid heating wall;

f) laying a plurality of courses of thermally stable, non-expanding large size modular cast ceiling blocks on the top of adjacent heating walls, at least one of the adjacent heating walls being the newly-laid heating wall, the cast ceiling blocks including (i) flue ceiling blocks stacked from a top of each wall to a top of a ceiling thereby extending the flue through the ceiling and (ii) second ceiling blocks stacked from the top of each wall to the top of the ceiling, defining passageways through the ceiling from the coking chamber bounded by the adjacent heating walls, each of the second ceiling blocks being wider than the distance between the adjacent heating walls;

g) mortaring the large size cast ceiling blocks into place; and h) pouring a top cover between the flue ceiling blocks and the second ceiling blocks to complete the ceiling.

2. The method as set forth in claim 1 further comprising staggering each of the subsequent courses of large size cast modules from a course immediately below so seams between the large size cast modules in each course do not vertically align with seams between the large size cast modules in the course immediately below.

3. The method as set forth in claim 1 in which vertically extending flues are formed by aligning the vertical openings of large size cast modules in each of the first course and subsequent layers, which flues may be used alternately for burning fuel gases or for drafting.

4. The method as set forth in claim 1 in which prior to step (a) existing walls are demolished with heavy equipment or machinery.

5. The method as set forth in claim 1 in which air ports in a floor of the oven are vacuumed out with heavy duty vacuuming equipment prior to step (a).

6. The method as set forth in claim 1 in which gas nozzles and air ports in a floor upon which the heating wall is to be reconstructed are covered over with at least one of a heavy paper and an aluminum sheet prior to step (a).

7. The method as set forth in claim 1 in which an interior of the oven is measured prior to fabrication of the large size cast modules, and the large size cast modules are custom made based on the measurements taken.

8. The method as set forth in claim 1 in which secondary air stacks are installed as the first course and a first of the subsequent layers are laid.

9. The method as set forth in claim 1 in which plugs are cut out of the first course of large size cast modules to form clean-out ports, and the plugs are mortared back into place to plug the clean-out ports before the heating walls are completely reconstructed.

10. A method of replacing a coke oven ceiling comprising:

laying a plurality of thermally stable, modular non-expanding large size cast ceiling blocks on the top of adjacent heating walls, the cast ceiling blocks including (i) flue ceiling blocks stacked from a top of each wall to a top of a ceiling extending a vertical flue in one of the adjacent heating walls through the ceiling and (ii) second ceiling blocks stacked from the top of the adjacent heating walls to the top of the ceiling, defining passageways through the ceiling from a coking chamber bounded by the adjacent heating walls, each of the second ceiling blocks being wider than the distance between the adjacent heating walls;

mortaring the large size cast blocks into place;

pouring a castable material in a space between the flue ceiling blocks and the second ceiling blocks to complete the ceiling.

11. The method of replacing a coke oven ceiling as set forth in claim 10 in which the passageways are one or more of a passageway to a standpipe, an aperture for a smoke hole, and an aperture for charging the coking chamber.

* * * * *